(12) United States Patent
Kaneko et al.

(10) Patent No.: US 9,618,074 B2
(45) Date of Patent: Apr. 11, 2017

(54) SHOCK ABSORBING MEMBER

(71) Applicants: Takanobu Kaneko, Kariya (JE); Naoya Sakaguchi, Toyota (JP); Kiyoichi Kita, Okazaki (JP); Tamaki Obayashi, Toyama (JP); Kyosuke Matsui, Chiryu (JP)

(72) Inventors: Takanobu Kaneko, Kariya (JE); Naoya Sakaguchi, Toyota (JP); Kiyoichi Kita, Okazaki (JP); Tamaki Obayashi, Toyama (JP); Kyosuke Matsui, Chiryu (JP)

(73) Assignees: Aisin Seiki Kabushiki Kaisha, Kariya-shi, Aichi-ken (JP); Toyota Jidosha Kabushiki Kaisha, Toyota-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 4 days.

(21) Appl. No.: 14/419,268

(22) PCT Filed: Jul. 29, 2013

(86) PCT No.: PCT/JP2013/070427
§ 371 (c)(1),
(2) Date: Feb. 3, 2015

(87) PCT Pub. No.: WO2014/021241
PCT Pub. Date: Feb. 6, 2014

(65) Prior Publication Data
US 2015/0176673 A1    Jun. 25, 2015

(30) Foreign Application Priority Data

Aug. 3, 2012 (JP) ................................. 2012-172803

(51) Int. Cl.
*F16F 7/12* (2006.01)
*B62D 21/15* (2006.01)
(Continued)

(52) U.S. Cl.
CPC .............. *F16F 7/121* (2013.01); *B60R 19/18* (2013.01); *B62D 21/157* (2013.01); *B60R 2019/1806* (2013.01); *B62D 25/2036* (2013.01)

(58) Field of Classification Search
CPC .. B62D 21/15; B62D 21/157; B62D 25/2036; B60R 19/02; B60R 19/023;
(Continued)

(56) References Cited

U.S. PATENT DOCUMENTS 6,431,641 B2 * 8/2002 Miyasaka ................ 296/187.12
6,746,061 B1 * 6/2004 Evans ..................... B60R 19/18
                                                                293/120
(Continued)

FOREIGN PATENT DOCUMENTS

JP          7-61374        3/1995
JP       2002-249078       9/2002
(Continued)

*Primary Examiner* — Anna Momper
(74) *Attorney, Agent, or Firm* — Finnegan, Henderson, Farabow, Garrett & Dunner, LLP

(57) ABSTRACT

A tubular-shaped shock absorbing member arranged at a side end portion of a vehicle, includes outer and inner wall portions each extending in a vehicle height direction and a vehicle front-and-rear direction, the inner wall portion being arranged on a center portion side of the vehicle, an upper wall portion connected to upper end portions of the inner and outer wall portions, a lower wall portion connected to lower end portions of the inner and outer wall portions, and a horizontal rib connected to the inner and outer wall portions. A distance between the upper and lower wall portions is decreased as approaching from the inner wall portion side to the outer wall portion side. A thickness of a part of the (Continued)

horizontal rib connected to the outer wall portion, is larger than a thickness of a part of the horizontal rib connected to the inner wall portion.

8 Claims, 4 Drawing Sheets

(51) Int. Cl.
 *B60R 19/18* (2006.01)
 *B62D 25/20* (2006.01)
(58) Field of Classification Search
 CPC . B60R 19/18; B60R 19/22; B60R 2019/1866; B60R 2019/1806; F16F 7/12; F16F 7/121; F16F 7/122
 See application file for complete search history.

(56) References Cited

U.S. PATENT DOCUMENTS

| | | | |
|---|---|---|---|
| 2006/0181090 A1* | 8/2006 | Boivin | B60R 19/18 293/146 |
| 2011/0148151 A1 | 6/2011 | Abe et al. | |

FOREIGN PATENT DOCUMENTS

| | | |
|---|---|---|
| JP | 2003-127896 | 5/2003 |
| JP | 2005-1474 | 1/2005 |
| JP | 2009-286331 | 12/2009 |
| JP | 2010-105428 | 5/2010 |
| JP | 2010-202118 | 9/2010 |
| WO | WO 2010/038598 A1 | 4/2010 |

* cited by examiner

SHOCK ABSORBING MEMBER

CROSS-REFERENCE TO RELATED APPLICATIONS

This application is a national phase application of International Application No. PCT/JP2013/070427, filed Jul. 29, 2013, and claims the priority of Japanese Application No. 2012-172803, filed Aug. 3, 2012, the content of both of which is incorporated herein by reference.

TECHNICAL FIELD

The present invention relates to a shock absorbing member to be provided at a side end portion of a vehicle and to be deformable when a load is applied to a side portion of the vehicle, to thereby absorb shock caused by the load.

BACKGROUND ART

Hitherto, as described in, for example, Patent Literature 1, there has been known a shock absorbing member (coupling member) to be provided in a vehicle cabin so as to extend in a vehicle width direction, and to couple a pair of right and left center pillars together. When the shock absorbing member is subjected to a compressive load in its longitudinal direction in the event of side collision, the shock absorbing member is bent so as to absorb shock caused by the side collision. The shock absorbing member is formed into a rectangular column shape so that side surface portions of a rod upper panel, which is provided so as to extend in the vehicle width direction and is open downward, and side surface portions of a rod lower panel, which is provided so as to extend in the vehicle width direction and is open upward, are joined together by arc welding at positions interspaced in the vehicle width direction. In this manner, portions that have undergone arc welding and portions that have not undergone arc welding are formed in the side surface portions of the shock absorbing member, and thus strength of the shock absorbing member against the compressive load in the longitudinal direction is varied, With this configuration, in the event of side collision, a bending position of the shock absorbing member is specified.

CITATION LIST

Patent Literature

[PTL 1] JP 2010-105428 A

SUMMARY OF INVENTION

The above-mentioned related-art shock absorbing member is bent at one position on an intermediate portion in the longitudinal direction. Accordingly, when the shock absorbing member starts to be bent and is then deformed to some extent, a reaction force of the shock absorbing member against the compressive load is abruptly reduced. In other words, after the shock absorbing member is deformed to some extent, the shock absorbing member cannot absorb the shock satisfactorily. Further, the bent portion of the shock absorbing member may project into the vehicle cabin. Further, when the rod upper panel and the rod lower panel are joined together by arc welding, welded positions slightly differ from product to product. Therefore, it is difficult to evenly specify the bending position of the shock absorbing member, with the result that an amount of absorbable shock is liable to fluctuate, Further, the above-mentioned related-art shock absorbing member is provided only between the pair of right and left center pillars. Therefore, in the event of collision at vicinities of the center pillars, the shock absorbing member absorbs the shock, but in the event of collision at positions separated from the center pillars forward or rearward, the shock absorbing member does not substantially absorb the shock. As described above, the above-mentioned related-art shock absorbing member is only applicable to collision in a narrow range. Therefore, it has been necessary to further reduce an influence on the vehicle cabin in the event of side collision.

Further, in the above-mentioned related-art shock absorbing member, it is necessary to manufacture the rod upper panel and the rod lower pan&, and to join both the panels together, and hence a plurality of processes are needed in order to manufacture the shock absorbing member. Further, a space for temporarily storing the rod upper panel and the rod lower panel is needed. Accordingly, the shock absorbing member is expensive.

The present invention has been made to solve the above-mentioned problems, and has an object to provide an inexpensive shock absorbing member capable of efficiently reducing an influence on a vehicle cabin in the event of side collision. Note that, in the following description of components of the present invention, for the sake of better understanding of the present invention, reference symbols of corresponding components in the embodiment of the prevent invention are described in parentheses, but the components of the present invention should not be construed as being limited to the corresponding components denoted by the reference symbols in the embodiment of the present invention.

In order to achieve the above-mentioned object, the present invention has a feature in a shock absorbing member (20) to be arranged at a side end portion of a vehicle and formed into a tubular shape so as to extend in a vehicle front-and-rear direction, the shock absorbing member being deformable when a load is applied to a side portion of the vehicle, to thereby absorb shock caused by the load, the shock absorbing member including: an outer wall portion (21) formed so as to extend in a vehicle height direction and the vehicle front-and-rear direction, and configured to be subjected to the load; an inner wall portion (22) formed so as to extend in the vehicle height direction and the vehicle front-and-rear direction, and arranged on a center portion side of the vehicle in a vehicle width direction with respect to the outer wall portion so as to be opposed to the outer wall section; an upper wall portion (23) connected to an upper end portion of the inner wall portion and an upper end portion of the outer wall portion; a lower wall portion (24) connected to a lower end portion of the inner wall portion and a lower end portion of the outer wall portion; and a horizontal rib (25) formed in a space surrounded by the outer wall portion, the inner wall portion, the upper wall portion, and the lower wall portion, and connected to the inner wall portion and the outer wall portion, in which a length of the outer wall portion in the vehicle height direction is set smaller than a length of the inner wall portion in the vehicle height direction, in which a distance in the vehicle height direction between the upper wall portion and the lower wall portion becomes smaller as approaching from the inner wall portion side to the outer wall portion side, and in which a thickness of a part of the horizontal rib, which is connected to the outer wall portion side, is set larger than a thickness of a part of the horizontal rib, which is connected to the inner wall portion side. In this case, it is preferred that a thickness of a part of the inner wall portion, which is positioned above the horizontal rib, be set larger than a thickness of a part of the inner wall portion, which is positioned below the horizontal rib.

When the inner wall portion of the shock absorbing member constructed as described above is fixed to a support member provided to the vehicle and an object (for example, a pole provided so as to extend in the vehicle height direction) is caused to collide against the vehicle from a side of the outer wall portion, the object thrusts into the inner wall portion side while deforming the shock absorbing member. At this time, the shock absorbing member absorbs the shock so as to keep a load applied to the support member from exceeding a predetermined load, to thereby reduce deformation of the support member.

In the above-mentioned shock absorbing member, the distance in the vehicle height direction between the upper wall portion and the lower wall portion is decreased as approaching from the inner wall portion side to the outer wall portion side. This configuration increases a possibility that, in the event of the above-mentioned collision, the shock absorbing member is deformed in an order from the outer wall portion side to the inner wall portion side as a thrust amount of the object increases. In addition, the horizontal rib is formed so that the thickness of the part of the horizontal rib, which is connected to the outer wall portion, is larger than the thickness of the part of the horizontal rib, which is connected to the inner wall portion. That is, the horizontal rib is formed so that strength thereof against the load applied in the vehicle width direction is lower at the part connected to the inner wall portion than at the part connected to the outer wall portion. With this configuration, regardless of the thrust amount of the object, it is possible to substantially uniform the load applied to the support member. In other words, a shock absorbing efficiency of the shock absorbing member can be increased. Further, the shock absorbing member is not deformed in a bending manner at an intermediate portion in the vehicle width direction, but can be deformed in a compressing manner in the vehicle width direction. Therefore, it is possible to prevent projection of the deformed portion into the vehicle cabin unlike the above-mentioned related-art shock absorbing member.

Further, the shock absorbing member is provided so as to extend in the vehicle front-and-rear direction, and hence can cover a wide collision range. That is, even in the event of collision at a position separated from a center pillar forward or rearward, the shock absorbing member can absorb the shock. As described above, according to one embodiment of the present invention, it is possible to efficiently reduce an influence on the vehicle cabin in the event of side collision. In addition, the shock absorbing member is constructed so that the distance in the vehicle height direction between the upper wall portion and the lower wall portion becomes smaller as approaching from the inner wall portion side to the outer wall portion side, and hence it is possible to prevent the shock absorbing member from falling down under application of the load from the outer wall portion side.

Further, the present invention has another feature in that the distance in the vehicle height direction between the upper wall portion and the lower wall portion becomes gradually smaller as approaching from the inner wall portion side to the outer wall portion side along the vehicle width direction. With this configuration, as compared to a case of a configuration in which the distance in the vehicle height direction between the upper wall portion and the lower wall portion is decreased in a stepwise manner as approaching from the inner wall portion side to the outer wall portion side along the vehicle width direction, it is possible to further uniform the load applied to the support member.

Further, the present invention has another feature in that the shock absorbing member further includes a vertical rib (26) formed so as to extend from the horizontal rib to the upper wall portion side and the lower wall portion side, and connected to the upper wall portion and the lower wall portion. In this case, it is preferred that the vertical rib be formed perpendicularly to the horizontal rib. With this configuration, strength of each of the upper wall portion and the lower wall portion can be increased.

Further, the present invention has another feature in that the horizontal rib is formed so that a plurality of rib portions (25a, 25b, 25c) each having a constant thickness in the vehicle front-and-rear direction and the vehicle width direction and having different thicknesses from each other are connected to each other in an ascending order from the inner wall portion side to the outer wall portion side in terms of the thicknesses of the plurality of rib portions, and that the vertical rib is formed so as to extend to the upper wall portion side and the lower wall portion side from a boundary between adjacent rib portions among the plurality of rib portions, and is connected to the upper wall portion and the lower wall portion. With this configuration, the horizontal rib has a thickness increased in a stepwise manner as approaching from the inner wall portion side to the outer wall portion side, and hence as compared to a case where the horizontal rib has a thickness gradually increased as approaching from the inner wall portion side to the outer wall portion side, the horizontal rib is formed easily. Further, the vertical rib is formed so as to extend from the boundary portion between the plurality of rib portions, and hence the strength of the upper wall portion and the lower wall portion can be further increased.

Further, the present invention has another feature in that the inner wall portion, the outer wall portion, the upper wall portion, the lower wall portion, the horizontal rib, and the vertical rib are formed integrally with each other. When the shock absorbing member is formed integrally by, for example, extrusion molding, the number of processes can be reduced as compared to a case where, as described in Patent Literature 1, the rod upper panel and the rod lower panel are manufactured and then joined together so as to form the shock absorbing member. Further, a space for temporarily storing a plurality of components is not needed. Therefore, the shock absorbing member can be manufactured at low cost. In addition, the shock absorbing member is not manufactured through combination of the plurality of components, but the shock absorbing member is integrally manufactured. Accordingly, a magnitude of the absorbable shock does not differ from product to product due to misalignment of joining positions of the plurality of components.

Further, the present invention has another feature in that the shock absorbing member is provided below a floor panel forming a floor of a vehicle cabin of the vehicle. The shock absorbing member is provided below the floor panel, and thus as compared to a case where the shock absorbing member is arranged on, for example, the floor panel in the vehicle cabin, a space in the vehicle cabin can be widened.

DESCRIPTION OF EMBODIMENT

Figure 1:
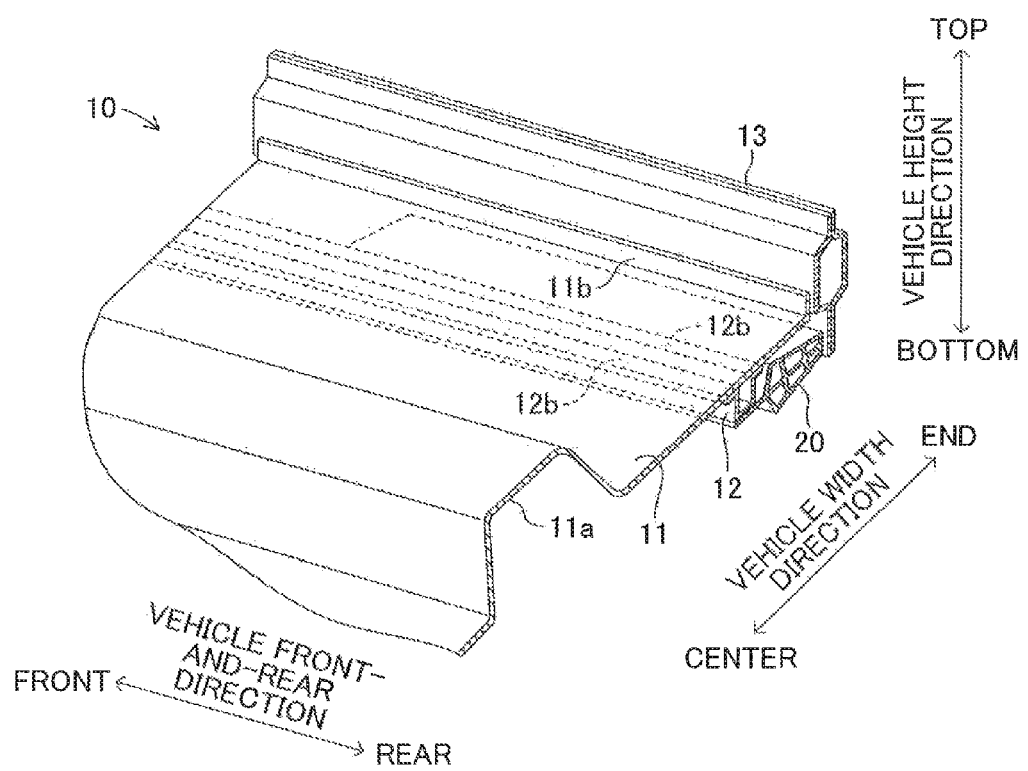
FIG. 1 is a perspective view of a vehicle cabin to which a shock absorbing member according to an embodiment of the present invention is applied, as viewed diagonally from a left rear of a vehicle.
Figure 2:
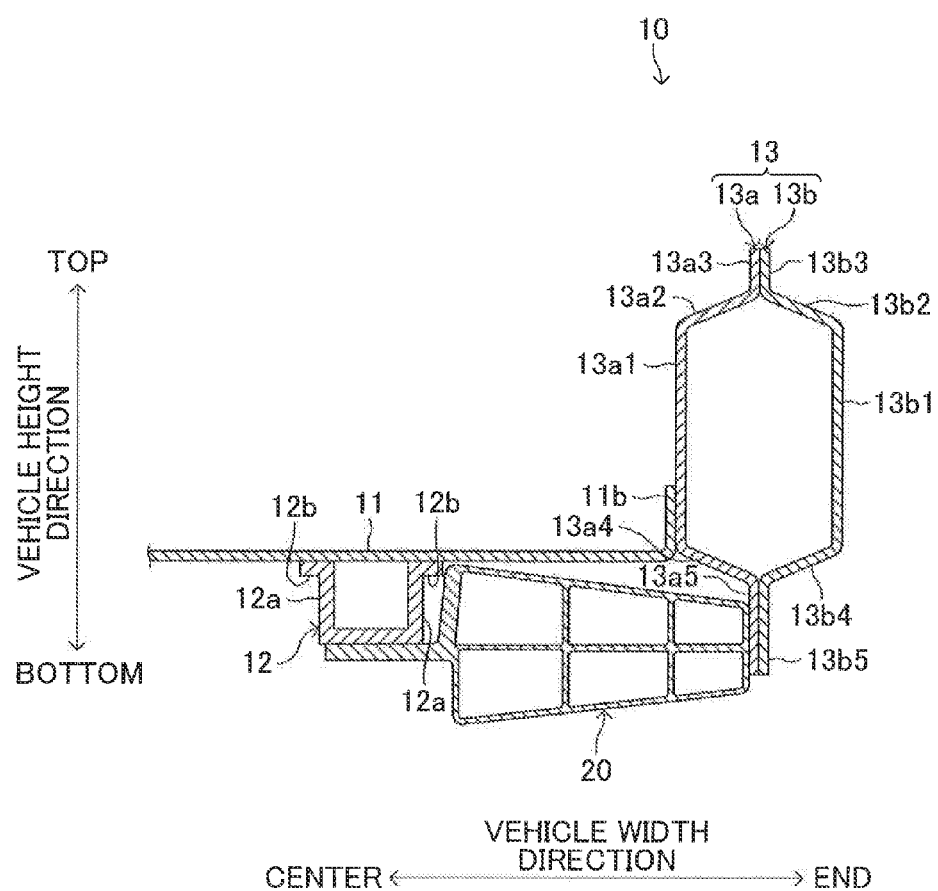
FIG. 2 is a front view of an end portion of the vehicle cabin of FIG. 1 in a vehicle width direction, as viewed from a rear of the vehicle cabin.
Figure 5:
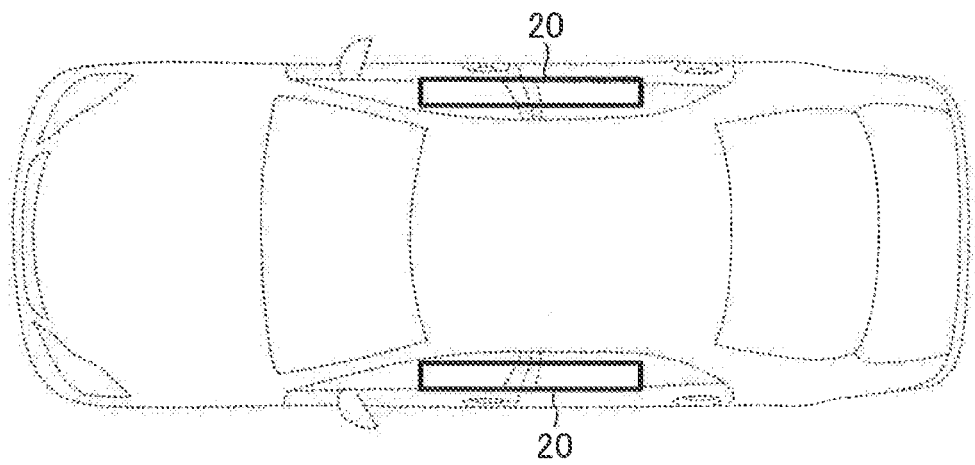
FIG. 5 is a top view of portions of the vehicle having the shock absorbing members of FIG. 1 mounted thereon.

A shock absorbing member 20 according to an embodiment of the present invention is described. As illustrated in FIG. 5, the shock absorbing member 20 is arranged at each side end portion of a vehicle at a position below a floor panel forming a floor of a vehicle cabin. Further, FIGS. 1 and 2 illustrate structure near the shock absorbing member 20 arranged on a right side of the vehicle in a vehicle width direction. Structure near the shock absorbing member 20 arranged on a left side of the vehicle in the vehicle width direction is constructed in a bilaterally symmetrical manner with respect to a center portion of the vehicle in the vehicle width direction, and hence description thereof is omitted. As illustrated in FIGS. 1 and 2, a plate-like floor panel 11 forming a floor portion of a vehicle cabin 10 is provided below the vehicle cabin 10. At a center portion of the floor panel 11 in the vehicle width direction, a tunnel portion 11a is formed so that its longitudinal direction extends in a vehicle front-and-rear direction. The tunnel portion 11a is formed by bending the center portion of the floor panel 11 in the vehicle width direction. Further, a flange portion 11b is formed at an end portion of the floor panel 11 in the vehicle width direction.

Further, an under-reinforcement 12 is assembled to a lower surface of the floor panel 11 so as to increase strength of the vehicle cabin 10 against a load applied in the vehicle front-and-rear direction. The under-reinforcement 12 is provided between the tunnel portion 11a and the flange portion 11b so as to extend in the vehicle front-and-rear direction. A cross-section of the under-reinforcement 12 taken along a plane perpendicular to the vehicle front-and-rear direction exhibits a rectangular shape that is open upward. Flange portions 12b, 12b are formed at upper end portions of right and left side wall portions 12a, 12a of the under-reinforcement 12, respectively. The flange portions 12b, 12b are joined to the lower surface of the floor panel 11, and thus the under-reinforcement 12 is assembled to the lower surface of the floor panel 11.

A rocker 13 forming a frame of a vehicle body is joined to the flange portion 11b of the floor panel 11. The rocker 13 is provided so as to extend in the vehicle front-and-rear direction. The rocker 13 is formed by joining a rocker inner panel 13a and a rocker outer panel 13b to each other.

The rocker inner panel 13a includes a vertical wall portion 13a1, an upper wall portion 13a2, an upper flange portion 13a3, a lower wall portion 13a4, and a lower flange portion 13a5. The vertical wall portion 13a1 is formed into a plate-like shape parallel to the flange portion 11b. The flange portion 11b is joined to a lower end portion of the vertical wall portion 13a1. The upper wall portion 13a2 is formed so as to extend from an upper end of the vertical wall portion 13a1 to an end portion side of the vehicle in the vehicle width direction. The upper flange portion 13a3 is formed so as to extend upward from an end portion side of the upper wall portion 13a2 in the vehicle width direction. Further, the lower wall portion 13a4 is formed so as to extend from a lower end of the vertical wall portion 13a1 to the end portion side in the vehicle width direction. The lower flange portion 13a5 is formed so as to extend downward from an end portion side of the lower wall portion 13a4 in the vehicle width direction.

The rocker outer panel 13b includes a vertical wall portion 13b1, an upper wall portion 13b2, an upper flange portion 13b3, a lower wall portion 13b4, and a lower flange portion 13b5. The vertical wall portion 13b1 is formed into a plate-like shape parallel to the flange portion 11b. The upper wall portion 13b2 is formed so as to extend from an upper end of the vertical wall portion 13b1 to the center portion side in the vehicle width direction. The upper flange portion 13b3 is formed so as to extend upward from a center portion side of the upper wall portion 13b2 in the vehicle width direction. Further, the lower wall portion 13b4 is formed so as to extend from a lower end of the vertical wall portion 13b1 to the center portion side of the vehicle cabin 10 in the vehicle width direction. The lower flange portion 13b5 is formed so as to extend downward from a center portion side of the lower wall portion 13b4 in the vehicle width direction.

The upper flange portion 13a3 and the upper flange portion 13b3 are joined together, and the lower flange portion 13a5 and the lower flange portion 13b5 are joined together. Thus, the rocker 13 is formed into a tubular shape extending in the vehicle front-and-rear direction.

Figure 3:
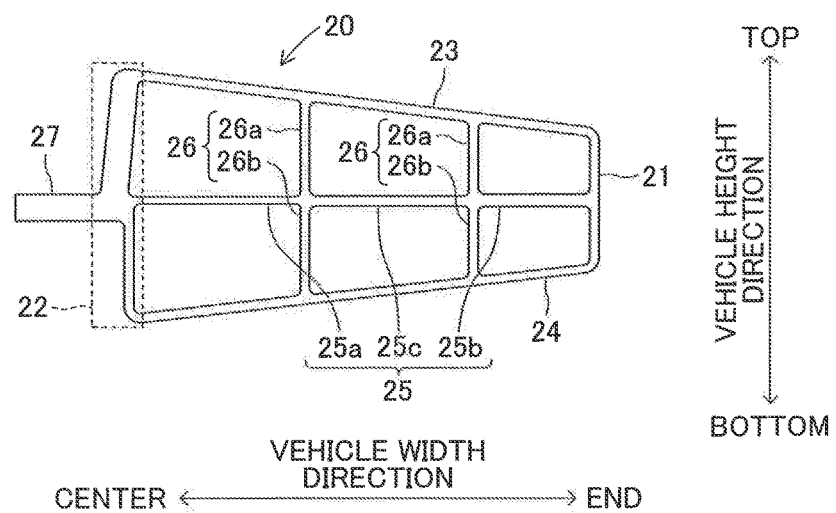
FIG. 3 is a front view of the shock absorbing member of FIG. 1.

Next, the shock absorbing member 20 is described with reference to FIG. 3. When the load is applied to a side portion of the vehicle, the shock absorbing member 20 is deformed so as to absorb shock caused by the load. With this shock absorbing function, the shock absorbing member 20 reduces a thrust amount of a member forming the side portion of the vehicle into the vehicle cabin 10 due to the load applied from a side of the vehicle. The shock absorbing member 20 is arranged at the side end portion of the vehicle cabin 10 at a position below the floor panel 11, specifically, as illustrated in FIG. 2, arranged between the under-reinforcement 12 and the rocker 13 so as to extend in the vehicle front-and-rear direction. The shock absorbing member 20 is formed integrally by extrusion molding of an aluminum material. The shock absorbing member 20 is formed into a tubular shape extending in the vehicle front-and-rear direction. The shock absorbing member 20 includes an outer wall portion 21, an inner wall portion 22, an upper wall portion 23, a lower wall portion 24, a horizontal rib 25, vertical ribs 26, and a connection portion 27.

The outer wall portion 21 is formed into a plate-like shape so as to extend in a vehicle height direction and the vehicle front-and-rear direction. The outer wall portion 21 abuts on the lower flange portion 13a5 of the rocker 13. The outer wall portion 21 serves as a part of the shock absorbing member 20, which is positioned on an end portion side thereof in the vehicle width direction. Therefore, in a case where the load is applied to the side portion of the vehicle, the load acts on the outer wall portion 21.

The inner wall portion 22 is formed at a position slightly separated from one of the side wall portions 12a to the rocker 13 side so as to extend in the vehicle height direction and the vehicle front-and-rear direction in parallel to the side wall portions 12a of the under-reinforcement 12. The inner wall portion 22 is arranged on the center portion side in the vehicle width direction with respect to the outer wall portion 21 so as to be opposed to the outer wall portion 21.

A length of the outer wall portion 21 in the vehicle height direction is smaller than a length of the inner wall portion 22 in the vehicle height direction. Further, the inner wall portion 22 is formed so that a thickness of the inner wall portion 22 in a range of from a center portion of the inner wall portion 22 in the vehicle height direction to an upper end thereof is slightly larger than a thickness of the inner wall portion 22 in a range of from the center portion in the vehicle height direction to a lower end thereof.

The upper wall portion 23 is formed so as to extend in the vehicle front-and-rear direction, and to extend in the vehicle width direction in a downwardly inclined manner when viewed from a front or a rear of the vehicle. An end portion of the upper wall portion 23, which is positioned on the under-reinforcement 12 side (center portion side in the vehicle width direction), is connected to the upper end of the inner wall portion 22, and an end portion of the upper wall portion 23, which is positioned on the rocker 13 side (end portion side in the vehicle width direction), is connected to an upper end of the outer wall portion 21.

The lower wall portion 24 is formed so as to extend in the vehicle front-and-rear direction, and to extend in the vehicle width direction in an upwardly inclined manner when viewed from the front or the rear of the vehicle. An end portion of the lower wall portion 24, which is positioned on the under-reinforcement 12 side (center portion side in the vehicle width direction), is connected to the lower end of the inner wall portion 22, and an end portion of the lower wall portion 24, which is positioned on the rocker 13 side (end portion side in the vehicle width direction), is connected to a lower end of the outer wall portion 21. As described above, the length of the outer wall portion 21 in the vehicle height direction is smaller than the length of the inner wall portion 22 in the vehicle height direction, and hence a distance in the vehicle height direction between the upper wall portion 23 and the lower wall portion 24 becomes gradually smaller as approaching from the inner wall portion 22 side to the outer wall portion 21 side along the vehicle width direction. That is, a cross-section of the shock absorbing member 20 taken along a plane perpendicular to the vehicle front-and-rear direction exhibits a trapezoid shape.

The horizontal rib 25 is formed so as to extend in the vehicle front-and-rear direction, and to extend in the vehicle width direction when viewed from the front or the rear of the vehicle. An end portion of the horizontal rib 25, which is positioned on the under-reinforcement 12 side (center portion side in the vehicle width direction), is connected to the inner wall portion 22, and an end portion of the horizontal rib 25, which is positioned on the rocker 13 side (end portion side in the vehicle width direction), is connected to the outer wall portion 21. A thickness of the horizontal rib 25 is increased in a stepwise manner as approaching from the inner wall portion 22 side to the outer wall portion 21 side. That is, the horizontal rib 25 includes an inner rib portion 25a connected to the inner wall portion 22, an outer rib portion 25b connected to the outer wall portion 21, and an intermediate rib portion 25c connected to the inner rib portion 25a and the outer rib portion 25b. A thickness of the intermediate rib portion 25c is slightly larger than a thickness of the inner rib portion 25a, and a thickness of the outer rib portion 25b is slightly larger than the thickness of the intermediate rib portion 25c. The thickness of each of the rib portions is substantially constant in the vehicle front-and-rear direction and the vehicle width direction. Therefore, the horizontal rib 25 is formed so that a plurality of rib portions each having the constant thickness in the vehicle front-and-rear direction and the vehicle width direction and having different thicknesses from each other are connected to each other in an ascending order from the inner wall portion 22 side to the outer wall portion 21 side in terms of the thicknesses of the plurality of rib portions.

Each of the vertical ribs 26 includes an upper rib 26a and a lower rib 26b. The upper rib 26a is formed so as to extend in the vehicle front-and-rear direction, and to extend in the vehicle height direction when viewed from the front or the rear of the vehicle. The upper rib 26a is formed so as to extend upward from a boundary between the inner rib portion 25a and the intermediate rib portion 25c or a boundary between the intermediate rib portion 25c and the outer rib portion 25b, specifically, from a boundary between the adjacent rib portions, and an upper end of the upper rib 26a is connected to a lower surface of the upper wall portion 23. Further, the lower rib 26b is formed so as to extend downward from the boundary between the inner rib portion 25a and the intermediate rib portion 25c or the boundary between the intermediate rib portion 25c and the outer rib portion 25b, specifically, from the boundary between the adjacent rib portions, and a lower end of the lower rib 26b is connected to an upper surface of the lower wall portion 24.

The connection portion 27 is formed into a plate-like shape so as to extend from an intermediate portion of the inner wall portion 22 in the vehicle height direction to the under-reinforcement 12 side (center portion side in the vehicle width direction). The connection portion 27 is joined to the lower surface of the under-reinforcement 12 so that the shock absorbing member 20 is assembled below the vehicle cabin 10.

When an object (for example, a pole provided so as to extend in the vehicle height direction) is caused to collide against the vehicle from a side of the vehicle having the shock absorbing member 20 mounted thereon, the object thrusts into the vehicle cabin while deforming the shock absorbing member 20. At this time, the shock absorbing member 20 absorbs the shock so as to keep the load applied to the under-reinforcement 12 from exceeding a predetermined load (for example, 80 kN (see FIG. 4)), to thereby reduce deformation of the under-reinforcement 12.

Figure 4:
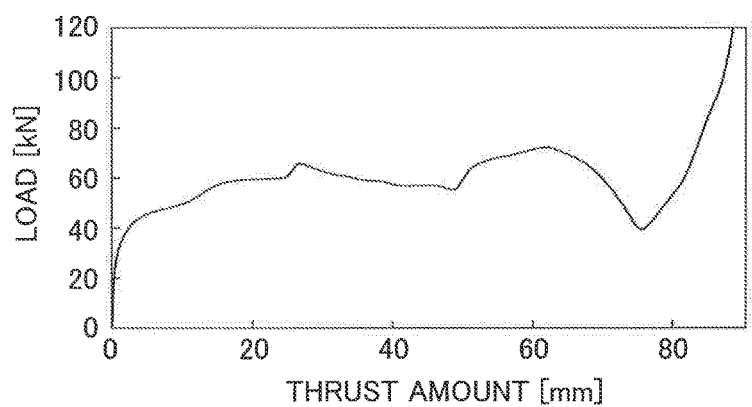
FIG. 4 is a graph showing results of a collision test of the shock absorbing member of FIG. 1.

In the shock absorbing member 20, the distance in the vehicle height direction between the upper wall portion 23 and the lower wall portion 24 is gradually decreased as approaching from the inner wall portion 22 side to the outer wall portion 21 side. This shape increases a possibility that, in the event of the above-mentioned collision, the shock absorbing member 20 is deformed in an order from the outer wall portion 21 side to the inner wall portion 22 side as the thrust amount of the object increases. In addition, the horizontal rib 25 is formed so as to have the thickness increased in a stepwise manner as approaching from the inner wall portion 22 side to the outer wall portion 21 side. That is, the horizontal rib 25 is constructed so that strength thereof against the load applied in the vehicle width direction is decreased in the order of the outer rib portion 25b, the intermediate rib portion 25c, and the inner rib portion 25a. Accordingly, a shock absorbing effect attained by the horizontal rib 25 is high at the beginning of deformation in which the outer wall portion 21 side is deformed (period in which the thrust amount of the object is small), and the shock absorbing effect is low at the end of deformation in which the inner wall portion 22 side is deformed (period in which the thrust amount of the object is large). Meanwhile, as described above, the distance in the height direction between the upper wall portion 23 and the lower wall portion 24 is small on the outer wall portion 21 side and large on the inner wall portion 22 side, and hence a shock absorbing effect attained by the upper wall portion 23 and the lower wall portion 24 is low at the beginning of deformation and high at the end of deformation. That is, according to the shock absorbing member 20, the horizontal rib 25 mainly absorbs the shock at the beginning of deformation, and the upper wall portion 23 and the lower wall portion 24 mainly absorb the shock at the end of deformation. Thus, the upper wall portion 23 and the lower wall portion 24 compensate for a reduction in shock absorbing function exerted by the horizontal rib 25, and the horizontal rib 25 compensates for a reduction in shock absorbing function exerted by the upper wall portion 23 and the lower wall portion 24. Thus, as shown in FIG. 4, regardless of the thrust amount of the object, it is possible to substantially uniform the load applied to the under-reinforcement 12. In other words, a shock absorbing efficiency of the shock absorbing member 20 can be increased. Further, the shock absorbing member 20 is not deformed in a bending manner at the intermediate portion in the vehicle width direction, but can be deformed in a compressing manner in the vehicle width direction. Therefore, it is possible to prevent projection of the deformed portion into the vehicle cabin unlike the above-mentioned related-art shock absorbing member.

Further, the shock absorbing member 20 is provided so as to extend in the vehicle front-and-rear direction, and hence can cover a wide collision range. That is, even in the event of collision at a position separated from a center pillar forward or rearward, the shock absorbing member 20 can absorb the shock. As described above, according to the shock absorbing member 20, it is possible to efficiently reduce an influence on the vehicle cabin in the event of side collision. In addition, the shock absorbing member 20 is constructed so that the distance in the vehicle height direction between the upper wall portion 23 and the lower wall portion 24 becomes smaller as approaching from the inner wall portion 22 side to the outer wall portion 21 side, and hence it is possible to prevent the shock absorbing member 20 from falling down under application of the load from the outer wall portion 21 side.

Further, the horizontal rib 25 has the thickness increased in a stepwise manner in the vehicle width direction, and hence as compared to a case where the horizontal rib 25 has a thickness gradually increased as approaching from the inner wall portion 22 side to the outer wall portion 21 side, a die used for extrusion molding of the shock absorbing member 20 is easily manufactured. Further, the upper rib 26*a* and the lower rib 26*b* are formed so as to extend from the boundary between the inner rib portion 25*a* and the intermediate rib portion 25*c* or from the boundary between the intermediate rib portion 25*c* and the outer rib portion 25*b*, and hence strength of the upper wall portion 23 and the lower wall portion 24 can be increased.

Further, the shock absorbing member 20 is formed integrally by extrusion molding, and hence the number of processes can be reduced as compared to a case where a rod upper panel and a rod lower panel are manufactured and then joined together so as to form the shock absorbing member. Further, a space for temporarily storing a plurality of components is not needed. Therefore, the shock absorbing member 20 can be manufactured at low cost. In addition, the shock absorbing member is not manufactured through combination of the plurality of components, but the shock absorbing member 20 is integrally manufactured by extrusion molding. Accordingly, a magnitude of absorbable shock does not differ from product to product due to misalignment of joining positions of the plurality of components. Further, the shock absorbing member 20 is integrally manufactured by extrusion molding, and hence it is possible to prevent the thicknesses of the inner rib portion 25*a*, the outer rib portion 25*b*, and the intermediate rib portion 25*c* from differing from product to product. Accordingly, it is possible to prevent the magnitude of the absorbable shock from differing from product to product.

Further, the shock absorbing member 20 is provided below the floor panel 11, and hence as compared to a case where the shock absorbing member is arranged on, for example, the floor panel 11 in the vehicle cabin 10, a space in the vehicle cabin 10 can be widened.

Further, when carrying out the present invention, the present invention is not limited to the above-mentioned embodiment, but various modifications may be made without departing from the object of the present invention.

For example, in the above-mentioned embodiment, the thickness of the horizontal rib 25 is varied in the vehicle width direction in three steps. However, the configuration of the horizontal rib 25 is not limited to that of the above-mentioned embodiment. The thickness of the horizontal rib 25 may be varied in the vehicle width direction in more than three steps such as four steps and five steps. Further, the thickness of the horizontal rib 25 may be varied in the vehicle width direction only in two steps.

Further, for example, a plurality of horizontal ribs 25 may be formed in parallel to each other. In this case, ribs similar to the vertical ribs 26 may be formed between the plurality of horizontal ribs 25. With this configuration, in the event of collision of the object, it is possible to further reduce a change in the load applied to the under-reinforcement 12.

Further, in the above-mentioned embodiment, the distance in the vehicle height direction between the upper wall portion 23 and the lower wall portion 24 is gradually decreased as approaching from the inner wall portion 22 side to the outer wall portion 21 side. However, the distance in the vehicle height direction between the upper wall portion 23 and the lower wall portion 24 may be decreased in a stepwise manner as approaching from the inner wall portion 22 side to the outer wall portion 21 side. However, the configuration of the above--mentioned embodiment is preferred in order to further uniform the load applied to the under-reinforcement 12 over a period from the beginning of deformation of the shock absorbing member 20 to the end of deformation of the shock absorbing member 20.

Further, in the above-mentioned embodiment, the vertical ribs 26 extend in the vehicle height direction when viewed from the front or the rear of the vehicle. That is, the vertical ribs 26 are formed perpendicularly to the horizontal rib 25. However, the vertical ribs 26 may be formed obliquely to the horizontal rib 25.

Further, in the above-mentioned embodiment, the thickness of the part of the inner wall portion 22, which is positioned above the horizontal rib 25, is different from the thickness of the part of the inner wall portion 22, which is positioned below the horizontal rib 25. However, the parts positioned above and below the horizontal rib 25 may have the same thickness.

The invention claimed is:

1. A shock absorbing member to be arranged at a side end portion of a vehicle and formed into a tubular shape so as to extend in a vehicle front-and-rear direction, the shock absorbing member being deformable when a load is applied to a side portion of the vehicle, to thereby absorb shock caused by the load, the shock absorbing member comprising:

an outer wall portion formed so as to extend in a vehicle height direction and the vehicle front-and-rear direction, and configured to be subjected to the load;

an inner wall portion formed so as to extend in the vehicle height direction and the vehicle front-and-rear direction, and arranged on a center portion side of the vehicle in a vehicle width direction with respect to the outer wall portion so as to be opposed to the outer wall portion;

an upper wall portion connected to an upper end portion of the inner wall portion and an upper end portion of the outer wall portion;

a lower wall portion connected to a lower end portion of the inner wall portion and a lower end portion of the outer wall portion; and a horizontal rib formed in a space surrounded by the outer wall portion, the inner wall portion, the upper wall portion, and the lower wall portion, and connected to the inner wall portion and the outer wall portion, wherein a length of the outer wall portion in the vehicle height direction is set smaller than a length of the inner wall portion in the vehicle height direction, wherein a distance in the vehicle height direction between the upper wall portion and the lower wall portion becomes smaller as approaching from the inner wall portion side to the outer wall portion side, wherein a thickness of a part of the horizontal rib, which is connected to the outer wall portion side, is set larger than a thickness of a part of the horizontal rib, which is connected to the inner wall portion side, wherein the horizontal rib is formed having a plurality of rib portions each having a constant thickness in the vehicle front-and-rear direction, wherein the shock absorbing member is provided below a floor panel forming a floor of a vehicle cabin of the vehicle, and wherein the shock absorbing member comprises a connection portion which is joined to the inner wall portion and the floor panel, and wherein the connection portion is formed into a plate so as to extend from an intermediate portion of the inner wall portion in the vehicle height direction to the center portion side in the vehicle width direction.

2. A shock absorbing member according to claim 1, wherein the distance in the vehicle height direction between the upper wall portion and the lower wall portion becomes gradually smaller as approaching from the inner wall portion side to the outer wall portion side along the vehicle width direction.

3. A shock absorbing member according to claim 1, wherein a thickness of a part of the inner wall portion, which is positioned above the horizontal rib, is set larger than a thickness of a part of the inner wall portion, which is positioned below the horizontal rib.

4. A shock absorbing member according to claim 1, further comprising a vertical rib formed so as to extend from the horizontal rib to the upper wall portion side and the lower wall portion side, and connected to the upper wall portion and the lower wall portion.

5. A shock absorbing member according to claim 4, wherein the vertical rib is formed perpendicularly to the horizontal rib.

6. A shock absorbing member according to claim 4,
wherein the plurality of rib portions each having a constant thickness in the vehicle width direction have different thicknesses from each other are connected to each other in an ascending order from the inner wall portion side to the outer wall portion side in terms of the thicknesses of the plurality of rib portions, and
wherein the vertical rib is formed so as to extend to the upper wall portion side and the lower wall portion side from a boundary between adjacent rib portions among the plurality of rib portions, and is connected to the upper wall portion and the lower wall portion.

7. A shock absorbing member according to claim 4, wherein the inner wall portion, the outer wall portion, the upper wall portion, the lower wall portion, the horizontal rib, and the vertical rib are formed integrally with each other.

8. A shock absorbing member according to claim 1, wherein the connection portion extends from the horizontal rib and is in alignment with the horizontal rib.

* * * * *